United States Patent Office 2,818,417
Patented Dec. 31, 1957

2,818,417

CYCLOMATIC COMPOUNDS

Jerome E. Brown and Hymin Shapiro, Detroit, and Earl G. De Witt, Royal Oak, Mich., assignors to Ethyl Corporation, New York, N. Y., a corporation of Delaware No Drawing. Application July 11, 1955
Serial No. 521,364

4 Claims. (Cl. 260—429)

The instant invention relates to a broad class of novel organometallic compounds and processes for their manufacture. More particularly, the present invention relates to novel and useful metallic cyclomatic compounds. Our invention specifically resides in providing novel cyclomatic manganese tricarbonyl compounds of improved antiknock quality and antiknock fluids and fuels containing the same. This application is a continuation-in-part of our earlier filed co-pending application Serial No. 325,224, filed December 10, 1952. Reference is also made to application Serial No. 365,279, filed June 30, 1953.

As will be apparent from the discussion hereinafter the metallic cyclomatic compounds of the present invention comprising a novel class of organometallic compounds have properties which render them of particular utility as additives. In the preparation of organometallic compounds for such use the properties of stability, volatility, and solubility are of considerable importance. Stability is important in the synthesis and storage of the compounds because additives having low stabilities often decompose in the presence of water, atmospheric constituents such as oxygen and carbon dioxide, and other gases frequently encountered such as sulfur dioxide and hydrogen sulfide. The importance of thermal stability becomes apparent from the fact that the resulting fuel or lubricant compositions frequently encounter diverse conditions of temperature such as those prevalent in tropic, temperate and arctic regions, as well as seasonal fluctuations in temperature in a specific region. Solubility is of considerable importance for ease of blending and in obtaining homogeneous compositions which remain compatible during long periods of storage. The importance of volatility is apparent from a consideration of the fact that volatility has considerable influence on engine inductibility, that is, the character of a fuel composition to readily undergo operations such as carburetion, manifolding and injection utilized to introduce or induct such compositions into internal combustion engines.

But for a few noteworthy substances, such as tetraethyllead and iron carbonyl, the state of the art has not advanced sufficiently to permit the preparation and isolation of "tailor made" organometallic substances having the necessary characteristics of stability, volatility, and solubility. It is evident, therefore, that the state of the art will be greatly enhanced by providing a class of organometallic compounds capable of being modified to meet the requirements of fuel and oil additives. Likewise, a noteworthy contribution to the art will be a method for the preparation of such compounds.

It is, therefore, an object of this invention to provide as new compositions of matter a novel class of organometallic compounds. Likewise, it is an object of this invention to provide processes for the preparation of these new compositions of matter. An additional object of the present invention is to provide a class of metallic cyclomatic compounds of particular utility as fuel additives. It is also an object of this invention to provide antiknock agents, and fluids and fuels containing the same, which possess greatly reduced wear-causing characteristics. It is a further object of our invention to provide fuels suitable for use in high efficiency spark ignition internal combustion engines requiring a fuel of high antiknock quality. A further object of this invention is to provide means for operating an internal combustion engine on a fuel containing mixtures of antiknock additives in a manner wherein the advantages of the antiknock are utilized to a maximum degree with a minimum of deleterious effect. Further objects of our invention will be apparent from the discussion which follows.

The above and other objects of our invention are accomplished by providing novel hydrocarbon cyclomatic manganese tricarbonyl compounds, as well as lubricating oils, antiknock fluids, and hydrocarbon fuels containing these new compounds in small amounts sufficient to improve the engine operating characteristics, antiknock properties, and combustion characteristics of said fuels, oils and fluids.

The hydrocarbon cyclomatic manganese tricarbonyl compounds of our invention have the general formula

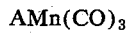

$$AMn(CO)_3$$

wherein A is a cyclomatic hydrocarbon radical having from 5 to 17 or more carbon atoms which embodies a group of 5 carbons having the configuration found in cyclopentadiene, said compounds being further characterized in that the cyclomatic hydrocarbon radical is bonded to the manganese by carbon-to-manganese bonds through carbons of the cyclopentadienyl group. The novel compounds as a whole have a total of from 8 to 20 or more carbon atoms. It is found that our new compounds have the most desirable solubility characteristics for use as additives in hydrocarbon fuels. A preferred group of compounds of this invention are those having from 8 to about 16 carbon atoms, as these are found to have the best inductibility characteristics when used in fuels in multicylinder engines.

When employing the compounds of our invention as fuel additives, we especially prefer compounds in which at least one of the carbon-to-carbon double bonds in the cyclopentadienyl group configuration is olefinic in nature. In other words, in this preferred embodiment not more than 2 carbons of the cyclopentadiene ring should be shared with an aromatic ring such as a benzene ring. An example of a compound of this preferred embodiment is the indenyl radical

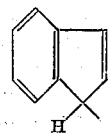

when A has this configuration or structure, the resulting cyclomatic manganese tricarbonyl compounds are found to have the optimum characteristics for use as fuel and lubricating additives.

Our compounds can be used as hydrocarbon fuel and lubricating oil additives. When added to hydrocarbon fuels, they act as antiknock agents enhancing the octane quality both of clear fuels and fuels containing other additives including other antiknock additives such as, for example, tetraethyllead. Our additives can be added directly to the fuel in the pure form or they can be first blended with other components such as scavengers, solvents, antioxidants, etc., into concentrated fluids and these fluids may then be added in the required amounts to fuels to obtain the finished fuel having an enhanced antiknock quality. When our additives are employed in fuels as, for example, in hydrocarbon fuels of the gasoline boiling range, the amount employed per gallon of fuel varies depending on the enhancement in antiknock quality desired. Thus, the amount can range from about 0.015 to about 10 grams of manganese per gallon of fuel in the form of a compound of this invention. When our novel compounds are employed in amounts equivalent to 0.015 gram of manganese per gallon of fuel, an enhancement in the antiknock value of the fuel is observed over that of the clear fuel. Concentrations of our additives equivalent to amounts greater than 10 grams of manganese per gallon can also be used, however, because of the extreme antiknock effectiveness of our compounds, it is usually not necessary to go above this figure. A preferred range of concentrations of our compounds in hydrocarbon fuels is from about 0.03 to about 6 grams of manganese per gallon as it is seldom necessary to go beyond these limits to obtain excellent antiknock effect.

The antiknock enhancement provided by the compounds of this invention is illustrated by the following results. When manganese in the form of methylcyclopentadienyl manganese tricarbonyl, a new compound of this invention, is added to a commercial fuel having an initial boiling point (I. B. P.) of 94° F. and a final boiling point (F. B. P.) of 390° F. in concentrations equivalent to one gram of manganese per gallon of fuel, the antiknock quality of the fuel, as determined by rating in a standard C. F. R. single-cylinder knock test engine according to ASTM test procedure D–908–51, is increased from 83.1 to 92.3 octane number units. To obtain the same increase with tetraethyllead in antiknock quality would require 3.22 grams of lead per gallon. Thus, manganese in the form of our compounds is 322 percent as effective as lead in the form of tetraethyllead in increasing the octane value of hydrocarbon fuels.

When one gram of manganese in the form of cyclopentadienyl manganese tricarbonyl is added per gallon of a commercial fuel having an I. B. P. of 112° C. and an F. B. P. of 318° C. and containing 3.13 grams of lead per gallon in the form of tetraethyllead, the increase in antiknock value is from 98.5 to 114.0 octane number units, or an increase of 15.5 octane numbers. To obtain this increase with lead would require an additional 7 grams of lead per gallon as tetraethyllead. Thus, manganese in the form of the compounds of this invention is as much as 700 percent as effective an antiknock as lead in the form of tetraethyllead when added to a fuel already containing 3.13 grams of lead per gallon.

When a commercial fuel having an I. B. P. of 90° F. and an F. B. P. of 406° F. containing 1.59 grams of lead per gallon as tetraethyllead is used in the operation of a multicylinder engine and the octane value determined by the modified borderline rating technique at 2000 R. P. M. as described below, it is found that 1.26 grams of manganese per gallon in the form of methylcyclopentadienyl manganese tricarbonyl increases the antiknock value by 7.4 octane numbers. It has been found, however, that when 1.26 grams of iron per gallon in the form of iron pentacarbonyl is employed in a commercial fuel containing 0.53 gram of lead per gallon in the form of tetraethyllead and having an octane number of 91.4, the octane quality of the fuel is increased to 94 octane numbers, an increase of 2.5 octane number units only, as determined in a multicylinder engine operated at a speed of 1750 R. P. M. Thus, the compounds of this invention are at least 296 percent as effective as iron carbonyl when employed in leaded commercial fuels in multicylinder engines.

Reference to the generic formula described hereinabove indicates that there are three primary constituents in the new compositions of matter of the present invention. These are first the cyclomatic constituent A, second the metallic constituent Mn, and third the electron donating group CO.

The primary constituent of the new compositions of matter of the present invention designated by the symbol A in the general formula presented hereinbefore comprises a cyclomatic radical, that is, a cyclopentadiene-type radical which is a radical containing the cyclopentadienyl moiety. In general, such cyclomatic groups can be represented by the four generic formulae presented hereinafter.

When a cyclomatic radical of the compounds of our invention is substituted with univalent aliphatic radicals, these substituents can be a radical selected from the group consisting of alkyl, alkenyl, aralkyl and aralkenyl. Thus, when these substituents are univalent aliphatic radicals they can be alkyl radicals, such as methyl, ethyl, n-propyl, isopropyl, n-butyl, isobutyl, sec-butyl, t-butyl, n-amyl, the various positional isomers thereof as, for example, 2-methylbutyl, 1,1-dimethylpropyl, 1-ethylpropyl, and the corresponding straight and branched chain isomers of hexyl, heptyl, octyl, nonyl, decyl, undecyl, dodecyl, tetradecyl, hexadecyl, nondecyl, eicosyl and the like. Likewise, the univalent aliphatic substituent can be an alkenyl radical, such as ethenyl, $\Delta^1$-propenyl, $\Delta^2$-propenyl, isopropenyl, $\Delta^1$-butenyl, $\Delta^2$-butenyl, $\Delta^3$-butenyl, and the branched chain isomers thereof as $\Delta^1$-isobutenyl, $\Delta^2$-isobutenyl, $\Delta^1$-sec-butenyl, $\Delta^2$ sec-butenyl, $\Delta^1$-pentenyl, $\Delta^2$-pentenyl, and the branched chain isomers thereof $\Delta^1$-hexenyl, $\Delta^3$-hexenyl, $\Delta^4$-hexenyl, and the branched chain isomers thereof, including, 3,3-dimethyl-$\Delta^1$-butenyl; 2,3-dimethyl-$\Delta^2$-butenyl; and 1-methyl-1-ethyl-$\Delta^2$-propenyl; and the various isomers of heptenyl, octenyl, nonenyl, decenyl, undecenyl, dodecenyl, tetradecenyl, heptadecenyl, octodecenyl, eicosenyl, and the like.

When the organic radical substituted in the cyclomatic group is a univalent aliphatic radical, it can be an aralkyl radical such as, for example, benzyl, $\alpha$-phenylethyl, $\beta$-phenylethyl, $\alpha$-phenylpropyl, $\alpha$-phenylisopropyl, $\alpha$-phenylbutyl, $\alpha$-phenylisobutyl, $\beta$-phenyl-t-butyl, $\alpha'$-naphthylmethyl, $\beta'$-naphthylmethyl, $\alpha$-($\alpha'$-naphthyl)-ethyl, $\beta$-($\alpha'$-naphthyl)-ethyl, $\alpha$-($\alpha'$-naphthyl)-propyl, $\alpha$-($\beta'$-naphthyl)-isopropyl, $\gamma$-($\alpha'$-naphthyl)-butyl, $\alpha$-($\alpha'$-naphthyl)-isobutyl, $\beta$-($\beta'$-naphthyl)-sec-butyl, the corresponding $\alpha'$- and $\beta'$-naphthyl derivatives of n-amyl and the various positional isomers thereof, and the like. Other such aralkyl radicals include the $\alpha'$-, $\beta'$-, and $\gamma'$-anthryl derivatives of alkyl radicals such as $\alpha'$-anthrylmethyl, $\beta$-($\gamma'$-anthryl)-ethyl, $\Delta$-($\beta'$-anthryl)-2-methylamyl, and the like, and the corresponding alkyl derivatives of phenanthrene, fluorene, acenaphthene, chrysene, pyrene, triphenylene, naphthacene, etc. The univalent aliphatic radical can be an aralkenyl radical such as $\alpha$-phenylethenyl, $\beta$-phenylethenyl, $\alpha$-phenyl-$\Delta^1$-propenyl, and the phenyl derivatives of the isomers of butenyl, pentenyl, heptenyl, and the like, up to about eicosenyl. Other such arylalkenyls include $\alpha$-($\alpha'$-naphthyl)-ethenyl, $\alpha$-($\beta'$-naphthyl)-ethenyl, $\alpha$-($\alpha'$-naphthyl)-$\Delta^1$-propenyl, $\alpha$-($\alpha'$-naphthyl)-$\Delta^2$-propenyl, $\alpha$-($\beta'$-naphthyl)-isopropenyl, and the like. In addition, such aromatic derivatives of alkenyls, that is, aralkenyl radicals include derivatives of phenanthrene, fluorene, acenaphthene, chrysene, naphthacene, and the like.

When the organic radicals comprising the substituents in the cyclomatic groups of the compounds of our invention are univalent alicyclic radicals, these can be radicals selected from the group consisting of cycloalkyl and cycloalkenyl radicals. Thus, such univalent alicyclic radicals can be cycloalkyl radicals such as, for example, cyclopropyl, cyclobutyl, cycloamyl, cyclohexyl, cyclononyl, cyclodecyl, cyclododecyl, cyclooctodecyl, cycloeicosyl, and such cycloaliphatic radicals as $\alpha$-cyclopropylethyl, $\alpha$-cyclobutylpropyl, and the like. Similarly, the alicyclic radical substituents can be cycloalkenyl radicals such as $\alpha$-cyclohexylethenyl, $\alpha$-cycloheptyl-$\Delta^1$-propenyl, $\beta$-cyclooctyl-$\Delta^2$-propenyl, $\alpha$-methylene-$\beta$-cyclododecylethyl, and the like.

When the organic radicals substituted in the cyclomatic groups of our compounds are univalent aromatic radicals, they can be selected from the group consisting of aryl and alkaryl radicals. Thus, these univalent aromatic radicals can be aryl radicals such as, for example, phenyl, naphthyl, anthryl, and the like, including the various monovalent radicals of such aromatics as indene, acenaphthene, fluorene, naphthacene, chrysene, and the like. Moreover, these univalent aromatic radicals can be alkaryl radicals such as, for example, tolyl, 3,5-xylyl, p-cumenyl, mesityl, ethylphenyl, 2 - methyl - α - naphthyl, 1-ethyl-β-naphthyl, and the like.

Having amply described the meaning of the term "organic radical," the discussion with regard to cyclomatic radicals has been facilitated. As stated hereinabove, the cyclomatic groups of the compounds of the present invention can be represented by four general formulae. The first class of cyclomatic radicals can be represented by the general formula

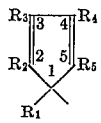
I wherein each of $R_1$, $R_2$, $R_3$, $R_4$ and $R_5$ can be the same or different and is selected from the group consisting of hydrogen and organic or hydrocarbon radicals having from about 1 to about 12 or more carbon atoms. Illustrative examples of such cyclomatic radicals include cyclopentadienyl; 1-methylcyclopentadienyl; 2,3-dimethylcyclopentadienyl; 3-ethylcyclopentadienyl; 1,3,4-tripropylcyclopentadienyl; 1,5-dipentylcyclopentadienyl; 2-methyl-4-t-butylcyclopentadienyl; 3-isopropenylcyclopentadienyl; 3,4-di-($\Delta^2$-isobutenyl)-cyclopentadienyl; 3-methyl-5-($\Delta^1$-pentenyl)-cyclopentadienyl; 3-(β-phenylethyl)-cyclopentadienyl; 3-cyclohexylcyclopentadienyl; 2-phenylcyclopentadienyl; 1-ethyl-3-(α-methyl)-cyclopentadienyl; 2-(o-tolyl)-cyclopentadienyl; 1-acetylcyclopentadienyl; and the like.

The second type of cyclomatic radical is the indenyl-type radical represented by the general formula

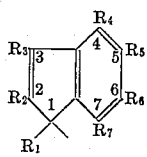
II wherein each of $R_1$, $R_2$, $R_3$, $R_4$, $R_5$, $R_6$ and $R_7$ can be the same or different and is selected from the group consisting of hydrogen and organic and hydrocarbon radicals having from 1 to about 12 or more carbon atoms. Illustrative examples of such cyclomatic radicals include indenyl; 2-methylindenyl; 3-sec-butylindenyl; 3,4-diethenylindenyl; 5-(α-phenylbutyl)-indenyl; 3-cyclohexylindenyl; 3-phenylindenyl; 4,5-diphenylindenyl; and the like.

The third type of cyclomatic radical of the new compositions of matter of the present invention is a radical of the fluorenyl type which can be represented by the general formula

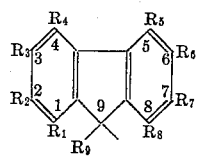
III wherein each of $R_1$, $R_2$, $R_3$, $R_4$, $R_5$, $R_6$, $R_7$, $R_8$ and $R_9$ can be the same or different and is selected from the group consisting of hydrogen and organic and hydrocarbon radicals having from 1 to about 12 or more carbon atoms. Illustrative examples of such radicals include fluorenyl; 3-ethylfluorenyl; 4,5-dipropylfluorenyl; 9-methylfluorenyl; 6-ethenylfluorenyl; 4-benzylfluorenyl; 2-m-tolylfluorenyl; and the like.

The fourth type of cyclomatic radical, that is, a radical containing the cyclopentadienyl moiety can be represented by the general formula

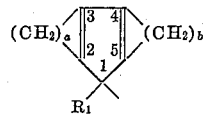
IV wherein $a$ and $b$ can be the same or different and are small whole integers including 0 and excluding 1, the sum $a+b$ being at least 2, and wherein $R_1$ is selected from the class consisting of hydrogen and organic radicals. Thus, when $a$ is zero each of the carbon atoms designated as 2 and 3 have attached thereto a monovalent radical selected from the class consisting of hydrogen and organic radicals. Furthermore, the monovalent radicals so attached can be the same or different. The same discussion applies to each of the carbon atoms designated as 4 and 5 when $b$ is zero. Illustrative examples of this type of cyclomatic radical include 4,5,6,7-tetrahydroindenyl; 1,2,3,4,5,6,7,8 - octahydrofluorenyl; 3-methyl-4,5,6,7-tetrahydroindenyl; and the like.

The third primary constituent of the new compositions of matter of the present invention is an electron donating group, namely, CO.

Non-limiting examples of the compounds of this invention in which the cyclomatic radical has the configuration shown in structure I above are cyclopentadienyl manganese tricarbonyl; methylcyclopentadienyl manganese tricarbonyl; ethylcyclopentadienyl manganese tricarbonyl; propylcyclopentadienyl manganese tricarbonyl; butenylcyclopentadienyl manganese tricarbonyl; tert-butylcyclopentadienyl manganese tricarbonyl; hexylcyclopentadienyl manganese tricarbonyl; cyclohexylcyclopentadienyl manganese tricarbonyl; heptylcyclopentadienyl manganese tricarbonyl; decylcyclopentadienyl manganese tricarbonyl; dodecylcyclopentadienyl manganese tricarbonyl; 1,2,3,4-tetramethylcyclopentadienyl manganese tricarbonyl; 1,2,3,4,5-pentamethylcyclopentadienyl manganese tricarbonyl; 1,3-dibutylcyclopentadienyl manganese tricarbonyl; 1,2-dipropyl-3-cyclohexylcyclopentadienyl manganese tricarbonyl; tolycyclopentadienyl manganese tricarbonyl; 1,3-diphenylcyclopentadienyl manganese tricarbonyl; acetylcyclopentadienyl manganese tricarbonyl; and the like.

When there is only one organo or hydrocarbo substituent on the cyclopentadienyl ring, its position is not specified since, according to theory, the cyclopentadienyl ring or group is bonded to the manganese by five equivalent bonds running from each of the five carbons in the cyclopentadienyl ring to the manganese. Since all these bonds are equivalent and all five carbons in the ring are equidistant from the manganese, it is immaterial to which of the five carbons a single substituent is attached. When, however, more than one substituent is attached to the cyclopentadienyl ring, the positions are given so as to indicate the relative postions of the different substituents with respect to each other on the cyclopentadienyl ring.

Examples of compounds having the configuration of structure II given hereinabove are indenyl manganese tricarbonyl; 3-methylindenyl manganese tricarbonyl; 3-ethenylindenyl manganese tricarbonyl; 2,3-dimethylindenyl manganese tricarbonyl; 1,3-diethylindenyl manganese tricarbonyl; 1,7-diisopropylindenyl manganese tricarbonyl; 1,2,3,4,5,6,7-heptamethylindenyl manganese tricarbonyl; 5-phenylindenyl manganese tricarbonyl; 3(2-ethylphenyl)indenyl manganese tricarbonyl; etc.

Examples of compounds having the configuration of structure III above are fluorenyl manganese tricarbonyl; 3-ethylfluorenyl manganese tricarbonyl; 4-propylfluorenyl manganese tricarbonyl; 2,3,4,7-tetramethylfluorenyl manganese tricarbonyl; and the like.

Examples of compounds having the configuration of structure IV above are 4,5,6,7-tetrahydroindenyl manganese tricarbonyl; 3-methyl-4,7-dihydroindenyl manganese tricarbonyl; 2 - ethyl - 3-phenyl-4,5,6,7-tetrahydroindenyl ganese tricarbonyl; 1,2,3,4,5,6,7,8 - octahydrofluorenyl manganese tricarbonyl; 1,4,5,8-tetrahydrofluorenyl manganese tricarbonyl, and the like.

The general methods for the preparation of the cyclomatic compounds of the instant invention comprise several types. One of these types involves the introduction into a metallic compound of a cyclomatic group or groups, followed by the introduction into the resulting intermediate compound of secondary groups designated herein as electron donating groups, namely, CO. A variation of this type of reaction comprises reacting manganese in a suitable active form with a cyclomatic hydrocarbon or a metallic cyclomatic compound to form an intermediate metallic cyclomatic compound followed by the introduction therein of electron donating groups, namely, CO. Another of the general type of reactions for the preparation of the novel organometallic compounds of the present invention comprises concurrently introducing into either a metallic compound, a metal per se or an active form thereof, a cyclomatic group or groups and the electron donating group CO. Another method for preparing our cyclomatic compounds consists of introducing into a manganese compound containing the carbon monoxide groups, the cyclopentadienyl moiety-containing groups; for example, the reaction of manganese pentacarbonyl with cyclopentadiene or methylcyclopentadiene to give cyclopentadienyl manganese tricarbonyl and methylcyclopentadienyl manganese tricarbonyl, respectively.

The first general method for the preparation of the compounds of the instant invention is generally conducted in two steps. The first step involves the formation of an intermediate cyclomatic manganese compound by the reaction of an active cyclomatic metal compound, such as cyclomatic magnesium halides, cyclomatic alkali metal compounds, cyclomatic zinc halides, and the like, with a compound of manganese. The second step which, in this case, is conducted subsequent to the first involves reacting the aforesaid intermediate with or without prior isolation so as to introduce therein the electron donating carbonyl groups. The reactions involved in the second step can be conducted in either the liquid phase at atmospheric pressure or thereabove, or in the gaseous or vapor phase under suitable conditions of temperature and pressure.

The second general method for the preparation of our cyclomatic compounds, that of concurrently introducing both cyclomatic and electron donating groups into a metallic compound, involves similar reactions to those above. The major difference between the two methods is the point at which the secondary group is introduced into the reaction sequence.

For example, by co-mingling in a suitable reaction vessel a manganese compound, such as manganous chloride, a cyclomatic alkali metal compound and carbon monoxide, which mixture is preferably maintained under elevated pressure, we obtain a cyclomatic manganese carbonyl, such as cyclopentadienyl manganese tricarbonyl. Similarly, by concurrently reacting manganese with a cyclomatic hydrocarbon and carbon monoxide in the presence of an active metal catalyst, we can prepare a cyclomatic manganese tricarbonyl, for example, methylcyclopentadienyl manganese tricarbonyl.

The third general method for the preparation of our new and novel cyclomatic compounds consists of reacting either a compound of manganese or the manganese metal per se with carbon monoxide so that the latter is introduced into the starting material. The resulting intermediate manganese carbonyl compound can then be reacted in situ or can be isolated and reacted with an active cyclomatic metallic compound, such as a cyclomatic Grignard reagent or a cyclomatic alkali metal compound, to prepare the desired cyclomatic manganese tricarbonyl compound.

One preferred preparative embodiment of this invention is to react a hydrocarbon cyclomatic manganese compound in which the cyclomatic group has from 5 to about 17 carbon atoms and which embodies five carbons having the general configuration found in cyclopentadiene, such as bis(cyclopentadienyl)manganese, with carbox monoxide at pressures of substantially zero to about 50,000 p. s. i. and at temperatures of substantially zero to about 350° C.

The cyclomatic manganese compound which is used in the preparation of the compounds of our invention is prepared by the reaction of a cyclomatic alkali metal compound with a manganese salt of an organic or inorganic acid, preferably the respective manganous salts. Examples of these manganese salts are manganous acetate, manganous benzoate, manganous carbonate, manganous oxalate, manganous lactate, manganous nitrate, manganous phosphate, manganic phosphate, manganous sulfate, manganous fluoride, manganous chloride, manganous bromide, and manganous iodide, and the like. In addition, manganese salts of β-diketones, such as tris(2,4-pentanedione) - manganese and tris(2,4 - hexanedione)-manganese may also be employed, as well as manganese salts of β-keto esters, such as the manganese salts of ethylacetoacetate, and the like. An example of this is the reaction of cyclopentadienyl sodium with manganous halide to give bis(cyclopentadienyl)manganese. Cyclomatic alkali metal compounds are also reacted with naturally occurring manganese ores, such as manganosite (MnO), manganese dioxide ($MnO_2$), manganic sesquioxide ($Mn_2O_3$), manganous sulfide (MnS), manganic sulfide ($MnS_2$) rhodochrosite ($MnCO_3$), and the like to give bis(cyclomatic)manganese compounds such as bis(methylcyclopentadienyl)manganese. etc. The cyclomatic manganese compound can be separated from the reaction mixture by distillation or other conventional methods and subsequently reacted with carbon monoxide, either with or without a solvent, or, the reaction mixture containing the cyclomatic manganese compound is subjected to reaction with carbon monoxide as above to give a reaction product containing the cyclomatic manganese tricarbonyl compound such as, for example, cyclopentadienyl manganese tricarbonyl. The latter can then be separated by conventional methods.

The cyclomatic alkali metal compound used in the preparation of our compounds is synthesized by reaction of a cyclomatic compound with an alkali metal or alkali metal amide. To the cyclomatic alkali metal compound, which is preferably contained in a suitable solvent such as tetrahydrofuran, is added the manganous salt and the resulting cyclomatic manganese compounds are reacted with carbon monoxide either in the reaction mixture or else in the pure state after separation as indicated above.

Another embodiment of our invention comprises introducing cyclopentadiene into a mixture of manganous salt and alkali metal and reacting the mixture thus obtained with carbon monoxide to produce the cyclomatic manganese tricarbonyl compounds of our invention. The product can be separated from the reaction mixture by solution in a solvent, such as an ether, and the removal of the solid impurities by filtration, centrifugation, and the like. The product can also be separated from the reaction mixture by steam distillation or selective solvent extraction. The solvent may be removed from the product by fractional distillation and the product further purified by fractional distillation or sublimation. The method of preparation is further illustrated in the examples below.

EXAMPLE I

*Cyclopentadienyl manganese tricarbonyl.*—A reaction vessel equipped with means for charging and discharging liquids and solids, gas inlet and outlet means, temperature measuring devices, heating and cooling means, means for agitation, and means for condensing vapors, was flushed with prepurified nitrogen. To the flask were then added 400 parts of tetrahydrofuran and 23 parts of sodium dispersed in 23 parts of mineral oil. An atmosphere of nitrogen was maintained in the reaction vessel throughout the run. The vessel was cooled to 10° C. and 66.7 parts of freshly-distilled cyclopentadiene was added in small increments with agitation while maintaining the temperature below 15° C. After the addition of the cyclopentadiene, the temperature was allowed to rise to 23° C. over a period of about two hours when the completion of the formation of the sodium cyclopentadiene was evidenced by the cessation of hydrogen evolution. To this solution of cyclopentadienyl sodium in tetrahydrofuran was added 63 parts of anhydrous manganous chloride. The mixture was heated and maintained at a reflux temperature for 20 hours. At the end of this time, the solvent was removed by distillation under reduced pressure and the product purified by sublimation at a pressure of about 2 mm. of mercury at about 130° C., producing 48.64 parts, 52.5 percent yield, of lustrous, brown-black bis-(cyclopentadienyl)manganese crystals. Analysis of the product showed it to contain 64.9 percent carbon and 5.44 percent hydrogen, corresponding to the formula $(C_5H_5)_2Mn$ calculated 64.9 percent carbon and 5.41 percent hydrogen. The bis(cyclopentadienyl)manganese oxidizes readily in air and should, therefore, be kept in an inert atmosphere, such as nitrogen.

The bis(cyclopentadienyl)manganese together with 88 parts of diethylether was charged under a nitrogen atmosphere to a pressure resistant vessel which had been flushed with prepurified nitrogen. The vessel was equipped with gas inlet and outlet valves, temperature and pressure measuring devices, heating and cooling means, and means for agitation. The vessel was pressured with carbon monoxide to 1975 p. s. i. at 26° C. and then the temperature was slowly raised to 158° C. The reaction between the CO and $(C_5H_5)_2Mn$ was conducted at a temperature within the range of 22° C.–158° C. and at a pressure ranging from 1160 to 2800 p. s. i. for a period of 7 hours. The excess CO was then released below 30° C. and the reaction mixture, a yellow-brown slurry, was removed from the vessel. The solids were removed by filtration and the residue washed with ether to remove the last traces of product which is soluble in the ether. The ether was then distilled off at reduced pressure and the product purified by sublimation. It consisted of a yellow air-stable, water-insoluble solid having a melting point of 77° C. It is readily soluble in most hydrocarbons and organic solvents including benzene, hydrocarbon fuels, lube oils, hexane, ether, alcohol, acetone, etc. Analysis showed it to contain 47.2% C, 2.46% H, and 26.9% Mn, corresponding to the formula $C_5H_5Mn(CO)_3$, calculated 47.0% C, 2.47% H, and 26.9% Mn. The yield was 75.4 percent based on the amount of dicyclopentadienyl manganese intermediate obtained, or 39.2 percent based on the amount of $MnCl_2$ employed.

In another run, the procedure of Example I was repeated except that the intermediate $(C_5H_5)_2Mn$ was not isolated. The reaction mixture containing this intermediate was reacted with carbon monoxide at pressures of 1460 to 2950 p. s. i. g. and at temperatures of 27–152° C. The product $C_5H_5Mn(CO)_3$ was separated by steam distillation and purified by sublimation. The yield was 65.6 percent based on the amount of $MnCl_2$ employed.

EXAMPLE II

*Methylcyclopentadienyl manganese tricarbonyl.*—The procedure of Example I was followed employing 400 parts of tetrahydrofuran, 23 parts of sodium dispersed in 23 parts of mineral oil, 80 parts of freshly-distilled methylcyclopentadiene, and 63 parts of powdered $MnCl_2$, containing 3.11 percent water. The manganous chloride was added to the methylcyclopentadienyl sodium solution at a temperature of 20° C. After maintaining the mixture at reflux temperature for two hours, the intermediate bis(methylcyclopentadienyl)manganese was separated by distillation at reduced pressure under nitrogen. It was a viscous, reddish-brown liquid which crystallized on standing. Analysis showed it to contain 66.7 percent carbon and 6.54 percent hydrogen, corresponding to the formula $(C_6H_7)_2Mn$; calculated 67.6% C and 6.62% H. The yield was 84.3 percent based on the amount of $MnCl_2$ employed. The bis(methylcyclopentadienyl)manganese is spontaneously combustible and, therefore, should not be exposed to oxygen of the atmosphere.

The intermediate was transferred under nitrogen to the pressure resistant vessel and the vessel charged with CO and heated from about 22° C.–148° C. at 680 to 2175 p. s. i. g. The reaction was essentially completed in about 1 hour as indicated by the cessation of CO uptake. The vessel was then cooled, the product mixture removed, and the resultant product—methylcyclopentadienyl manganese tricarbonyl—purified by fractional distillation at reduced pressures. The product distilled at 106.5° C. at a pressure of 12 mm. of mercury, and was a yellow-orange liquid having a freezing point of —0.75° C., a refractive index ($n_D^{20}$) of 1.5873, and a density ($d_{20}^4$) of 1.3942. It has a vapor pressure ranging from 8 mm. at 100° C. to 360.6 mm. at 200° C. It is readily soluble in hydrocarbons and most organic solvents, including hexane, hydrocarbon fuels, such as gasoline and diesel fuels, lubricating oils, alcohols, ether, acetone, ethylene glycol, etc. Analysis of the compound showed 24.7 percent manganese, 49.9 percent carbon, and 3.16 percent hydrogen; calculated 25.2% Mn, 49.6% C, and 3.21% H. The yield was 77.8 percent based on the amount of bis(methylcyclopentadienyl) manganese used and 65.6 percent based on the amount of $MnCl_2$ employed. A good yield is also obtained when the process of Example II is carried out using a pressure of carbon monoxide of substantially 10 p. s. i. g.

The process of Example II was repeated except that the intermediate reaction mixture was reacted with carbon monoxide at a temperature of substantially 34° C. and a pressure of about 1195–2000 p. s. i. The yield of methylcyclopentadienyl manganese tricarbonyl was 61.3 percent based on the amount of manganous chloride employed.

A variation of Example II, by which the same product is prepared, consists of adding methylcyclopentadiene to a mixture of manganous chloride and sodium dispersed in mineral oil and then reacting the mixture thus obtained with carbon monoxide to get a good yield of methylcyclopentadienyl manganese tricarbonyl.

EXAMPLE III

*Methylcyclopentadienyl manganese tricarbonyl.*—Carbon monoxide was reacted with bis(methylcyclopentadienyl)manganese in tetrahydrofuran at substantially 170° C. and 400–500 p. s. i. over a period of about 5.75 hours. The reaction mixture was then discharged into about 800 parts of water and steam distilled, taking off the tetrahydrofuran first and the product next. The product was separated from the water layer and purified by distillation at reduced pressures. Based on the amount of $MnCl_2$ employed, 54.2 percent of methylcyclopentadienyl manganese tricarbonyl product was obtained.

Good yields are also obtained when pressures of carbon monoxide below one atmosphere are employed.

EXAMPLE IV

*Ethylcyclopentadienyl manganese tricarbonyl.*—Ethylcyclopentadiene was prepared by reaction of cyclopentadienyl sodium with ethyl bromide. Then, ethylcyclopentadienyl manganese tricarbonyl was prepared according to the process described in Example I. The product had a refractive index of 1.5760 and a boiling point of 48° C.–49° C. at 0.3 mm. of mercury. On analysis it was found to contain 52.1 percent carbon, 4 percent hydrogen, and 22.7 percent manganese, corresponding to the formula $C_7H_9Mn(CO)_3$; calculated 51.8% C, 3.88% H and 23.0% Mn.

EXAMPLE V

*Allylcyclopentadienyl manganese tricarbonyl.*—The procedure of Example IV is followed using allyl chloride in place of ethyl bromide, potassium in place of sodium, and tris(2,4-pentanedione)manganese in place of manganous chloride. A good yield of allylcyclopentadienyl manganese tricarbonyl is obtained. Good yields are also obtained when lithium is used in place of potassium.

EXAMPLE VI

*Phenylcyclopentadienyl manganese tricarbonyl.*—Phenylcyclopentadiene, obtained by treating cyclopentenone with phenyl lithium to give 1-phenyl-2-cyclopentene-1-ol which upon distillation yields phenylcyclopentadiene, is reacted with sodium according to the procedure described in Example I to give phenylcyclopentadienyl sodium. This is reacted with manganese bromide to give bis(phenylcyclopentadienyl)manganese and the reaction mixture contacted with CO at a pressure of substantially 300 p. s. i. and a temperature of substantially 200° C. to give phenylcyclopentadienyl manganese tricarbonyl in good yield.

EXAMPLE VII

The procedure of Example I is followed except that a mixture of cyclopentadiene and methylcyclopentadiene are employed in place of cyclopentadiene. A high yield of a mixture of cyclopentadienyl manganese tricarbonyl and methylcyclopentadienyl manganese tricarbonyl is obtained.

EXAMPLE VIII

*Indenyl manganese tricarbonyl.*—The procedure of Example I was followed using indene in place of cyclopentadiene. Upon reaction of the bis(indenyl)manganese without separation from the reaction mixture with carbon monoxide at a temperature of substantially 150° C. and a pressure of substantially 3000 p. s. i. over a period of 3.5 hours, followed by an ether extraction of the product from the reaction mixture, a good yield of indenyl manganese tricarbonyl was obtained. The product consisted of orange-colored crystals having a melting point of 50° C.–51° C. and was soluble in ether, benzene, petroleum hydrocarbons, and acetone. Analysis showed it to contain 57.0 percent carbon and 2.93 percent hydrogen, corresponding to the general formula $C_9H_7Mn(CO)_3$ wherein $C_9H_7$ denotes an indenyl radical; calculated 57.7% C and 2.76% H.

EXAMPLE IX

*1,2,3,4,5 - pentamethylcyclopentadienyl manganese tricarbonyl.*—The procedure of Example II is employed using 136 parts of 1,2,3,4,5-pentamethylcyclopentadiene and 108 parts of manganous bromide ($MnBr_2$). Lithium was used in place of sodium. The intermediate reaction mixture is reacted with carbon monoxide at less than one atmosphere and at 300° C. to give a good yield of 1,2,3,4,5 - pentamethylcyclopentadienyl manganese tricarbonyl.

Good results are also obtained when $MnI_2$ is used in place of $MnBr_2$.

EXAMPLE X

*Octylcyclopentadienyl manganese tricarbonyl.*—The procedure of Example II is followed using 178 parts of 2-octylcyclopentadiene, a dispersion of potassium instead of sodium, and 44 parts of manganese dioxide. The reaction mixture containing bis(octylcyclopentadienyl)-manganese is reacted with CO at a pressure of 10 p. s. i. g. and a temperature of 122° C. to give a good yield of octylcyclopentadienyl manganese tricarbonyl.

Good results are also obtained when rubidium or cesium are used as the alkali metals and other manganese ores in place of $MnO_2$, e. g., MnO, $Mn_3O_4$, MnS, $MnCO_3$, etc.

EXAMPLE XI

*1-naphthyl-2-ethylcyclopentadienyl manganese tricarbonyl.*—The procedure of Example II is followed using 222 parts of 1-naphthyl-2-ethylcyclopentadiene and 63 parts of manganous fluoride. The reaction mixture containing bis(1-naphthyl-2-ethyl-cyclopentadienyl)manganese is reacted with carbon monoxide at a pressure of 20 lbs. and at a temperature of 78° C. to give a good yield of 1 - naphthyl - 2 - ethylcyclopentadienyl manganese tricarbonyl.

EXAMPLE XII

*1,3,4,7-tetramethylindenyl manganese tricarbonyl.*—The procedure of Example II is carried out employing 172 parts of 1,3,4,7-tetramethylindene and 86 parts of manganous acetate. The reaction mixture containing the bis(1,3,4,7-tetramethylindenyl)manganese is reacted with CO at a pressure of 1000 p. s. i. and at a temperature of 20° C. to give a good yield of 1,3,4,7-tetramethylindenyl manganese tricarbonyl.

EXAMPLE XIII

*3-cyclohexylindenyl manganese tricarbonyl.*—Following the procedure of Example II, 192 parts of 3-cyclohexylindene is reacted with 150 parts of manganous benzoate and the reaction mixture containing bis(3-cyclohexylindenyl)manganese is reacted with carbon monoxide at a pressure of 10,000 p. s. i. and a temperature of 0° C. to give 3-cyclohexylindenyl manganese tricarbonyl.

EXAMPLE XIV

*4,5,6,7-tetrahydroindenyl manganese tricarbonyl.*—In the process of Example II 120 parts of 4,5,6,7-tetrahydroindene is reacted with 72 parts of manganous oxalate. The intermediate reaction mixture is reacted with carbon monoxide at a pressure of 20,000 p. s. i. and a temperature of 220° C. to give a good yield of 4,5,6,7-tetrahydroindenyl manganese tricarbonyl.

EXAMPLE XV

*1,2,3,4,5,6,7,8 - octahydrofluorenyl manganese tricarbonyl.*—The procedure of Example II is followed in reacting 174 parts of 1,2,3,4,5,6,7,8-octahydrofluorene with 76 parts of manganous sulfate and the reaction mixture containing bis(1,2,3,4,5,6,7,8 - octahydrofluorenyl)manganese is reacted with carbon monoxide at a pressure of 50,000 p. s. i. and a temperature of 350° C. to give a good yield of 1,2,3,4,5,6,7,8-octahydrofluorenyl manganese tricarbonyl.

EXAMPLE XVI

*1,8-diethylfluorenyl manganese tricarbonyl.*—Following the procedure described in Example II, 222 parts of 1,8-diethylfluorene is reacted with 93 parts of manganous nitrate and the reaction mixture containing bis(1,8-diethylfluorenyl)manganese is reacted with carbon monoxide at a pressure of 40,000 p. s. i. and a temperature of 240° C. to give a good yield of 1,8-diethylfluorenyl manganese tricarbonyl.

EXAMPLE XVII

*Fluorenyl manganese tricarbonyl.*—The procedure of Example II is followed in reacting 166 parts of fluorene with 59 parts of manganous phosphate, and the reaction mixture containing bis(fluorenyl)manganese is reacted with carbon monoxide at a pressure of substantially 5000 p. s. i. at a temperature of substantially 200° C. to give a good yield of fluorenyl manganese tricarbonyl.

The temperatures of the steps in our process may be varied. For example, the reaction of sodium with the cyclomatic compound can be performed at temperatures up to the boiling point of the cyclomatic compound. For dicyclopentadiene, this is about 175° C. at which point cracking to the monomer occurs and the latter reacts with sodium to form cyclopentadienyl sodium. A preferred range of temperatures is from about 10° C. to about 65° C. when conducting the reaction in a solvent, such as tetrahydrofuran. The upper temperature represents the boiling point of tetrahydrofuran. The manganese salt, i. e., $MnCl_2$, $MnBr_2$, or $MnSO_4$, etc., may be added to the alkali metal cyclomatic compound at temperatures ranging from −20 to 65° C. and higher, depending on the boiling point of the solvent, and since there is no great temperature rise upon addition of the manganese halide, the temperature limits are not critical. However, we prefer to conduct this reaction at a temperature of from 20–65° C. in order to cut down the time of reaction. The reaction mixture need not be refluxed; however, reflux periods up to 16 hours have been employed with good success.

The temperature at which CO reacts with the intermediate bis(cyclomatic)manganese compound varies from 0° C. to about 350° C. with the rate of reaction increasing as the temperature is increased. The temperature of the reaction depends on the freezing point of the intermediate bis(cyclomatic)manganese compound or the freezing point of the solvent employed, if any, and also upon the pressure. An especially preferred range of temperatures for the carbonylation of the cyclomatic manganese intermediate is from 20 to about 200° C., as temperatures within this range are easily maintainable and good yields are realized.

Carbon monoxide reacts with the cyclomatic manganese compound to form the cyclomatic manganese tricarbonyl compounds at pressures below atmospheric to as high as 50,000 p. s. i. and higher. However, a preferred range of pressures at which the reaction can be conducted is from about 10 to about 10,000 p. s. i. g., as no great advantage is gained by going to higher pressures, and at pressures below about 10 p. s. i. g. the time required to obtain a given amount of product is considerably lengthened. An especially preferred range of pressures for the carbonylation of cyclomatic manganese compounds according to this invention is from 20 to about 1000 p. s. i. as it is found that this reaction proceeds quite readily and can be conducted in moderate-pressure apparatus.

The time of reaction of any part of the processes depends on temperature and pressure conditions, etc., and will vary over a wide range. For instance, the reaction of sodium with cyclopentadiene is practically instantaneous and the rate of admixture of reactants depends on the efficiency of cooling. Therefore, the time of reaction can vary from several minutes to a few hours, such as 4 hours. The time for reaction between the cyclomatic manganese compound and CO can also vary within wide limits, depending on temperature, pressure, and the extent of reaction that is desired. Thus, at high pressures and temperatures the reaction goes to completion in a matter of a few minutes, while at lower pressures and temperatures it may be advantageous to keep the CO in contact and in agitation with the cyclomatic manganese compound for a period of 1–10 hours.

Solvents other than tetrahydrofuran, ether, and benzene were used in other runs which are not included in the illustrative examples given hereinabove. Such other solvents, or mixtures thereof, which were employed are n-butyl ether, dioxane, toluene, and dimethyl ether of ethylene glycol. Also, as indicated above, solvents are not essential for the conduction of the reaction of carbon monoxide with the cyclomatic manganese compounds to produce the cyclomatic manganese tricarbonyl compounds.

The alkali metals used in our process to make the metal derivatives of the cyclomatic compounds which are then reacted with a manganese metal or compound to make the cyclomatic manganese compound include lithium, sodium, potassium, rubidium, and cesium. Metals other than the alkali metals that can be used are the group IIA metals such as beryllium, magnesium, calcium, strontium, and barium, and group IIB metals such as zinc and cadmium. In the case of polyvalent metals, the compounds may contain halogen such as the Grignard reagent in the case of magnesium.

The product recovery procedure employed depends on the method of preparation and on the compound synthesized. When reacting CO with pure bis(cyclomatic)-manganese, the product may be separated and purified by fractional distillation or sublimation at reduced pressures as illustrated hereinabove. Another method of separation is to steam distill the reaction mixture, separate the organic product layer from the aqueous layer and further purify the product by fractional distillation at reduced pressures. This latter method is employed with good success when the carbon monoxide is reacted with the intermediate from its reaction mixture. Another method of separation involves extraction of the cyclomatic manganese tricarbonyl compound from the reaction mixture with selective solvents such as benzene, ether, etc., and the separation of the product from the solvent by fractional distillation followed by further purification consisting of either fractional distillation, sublimation, or both.

In the above examples the cyclomatic alkali metal compound was prepared by reaction of the cyclomatic compound with a dispersion of the alkali metal in mineral oil. A number of other methods for the preparation of these compounds may be employed however. For example, sodium cyclopentadiene has been prepared by the reaction of cyclopentadiene with sodamide.

In the above examples nitrogen was employed as the inert atmosphere to prevent oxygen from coming in contact with the reactants. Other inert gases may also be used, e. g., argon, methane, ethane, propane, and other hydrocarbons and vapors of the solvents employed in the reaction.

Our compounds can be employed with hydrocarbon fuels and lubricating oils for improving operating characteristics of reciprocating, spark fired, or compression ignition engines. The compounds can be used in fuels and lubricating oils by themselves or together with other additive components, such as scavengers, deposit modifying agents containing phosphorus and/or boron, and also other antiknock agents, such as tetraethyllead, etc.

The compounds can be added directly to the hydrocarbon fuels or lubricating oils and the mixture subjected to stirring, mixing, or other means of agitation until a homogeneous fluid results. Alternatively, the compounds of our invention may be first made up into concentrated fluids containing solvents, such as kerosene, toluene, hexane, and the like, as well as other additives such as scavengers, antioxidants and other antiknock agents, e. g., tetraethyllead. Still other components that can be present are discussed more fully hereinbelow. The concentrated fluids can then be added to the fuels.

Where halohydrocarbon compounds are employed as scavenging agents, the amounts of halogen used are given in terms of theories of halogen. A theory of halogen is defined as the amount of halogen which is necessary to react completely with the metal present in the antiknock mixture to convert it to the metal dihalide as, for example, lead dihalide and manganese dihalide. In other words, a theory of halogen represents two atoms of halogen for every atom of lead and/or manganese present. In like manner, a theory of phosphorus is the amount of phosphorus required to convert the lead present to lead orthophosphate, $Pb_3(PO_4)_2$, that is, a theory of phosphorus based on lead represents an atom ratio of two atoms of phosphorus to three atoms of lead. When based on manganese, a theory of phosphorus likewise represents two atoms of phosphorus for every three atoms of manganese, that is, sufficient phosphorus to convert manganese to manganese orthophosphate, $Mn_3(PO_4)_2$.

When employing the compounds of this invention together with scavengers, an antiknock fluid for addition to hydrocarbon fuels is prepared comprising hydrocarbon cyclomatic manganese tricarbonyl compounds together with various halogen-containing organic compounds having from 2 to about 20 carbon atoms in such relative proportions that the atom ratio of manganese-to-halogen is from about 50:1 to about 1:12. The scavenger compounds can be halohydrocarbons both aliphatic and aromatic in nature, or a combination of the two, with halogens being attached to carbons either in the aliphatic or the aromatic portions of the molecule. The scavenger compounds may also be carbon, hydrogen, and oxygen-containing compounds, such as haloalkyl ethers, halohydrins, halo esters, halonitro compounds, and the like. Still other examples of scavengers that may be used in conjunction with our manganese compounds either with or without hydrocarbolead compounds are illustrated in U. S. Patents 2,398,281 and 2,479,900–903, and the like. Mixtures of different scavengers may also be used. These fluids can contain other components as stated hereinabove. In like manner, manganese-containing fluids are prepared containing from 0.01 to 1.5 theories of phosphorus in the form of phosphorus compounds. To make up the finished fuels, the concentrated fluids are added to the hydrocarbon fuel in the desired amounts and the homogeneous fluid obtained by mixing, agitation, etc.

The ratio of the weight of manganese to lead in fluids and fuels containing the two components can vary from about 1:880 to about 50:1. When no lead is present, the latter figure becomes 1:0. A preferred range of ratios, however, when both the manganese compounds of this invention and hydrocarbolead compounds are employed, is from about 1:63.4 to about 30:1. For example, the addition of 0.05 gram of manganese per gallon in the form of 1,2,3,4,5,6,7,8-octahydrofluorenyl manganese tricarbonyl to a commercial fuel having an initial boiling point of 90° F. and a final boiling point of 406° F. and containing 3.17 grams of lead per gallon in the form of tetraethyllead improves the antiknock qualities of the fuel. The ratio of manganese to lead on a weight basis is 1:63.4 in this case. In like manner, the addition of 6 grams of manganese per gallon to the same fuel containing 0.2 gram of lead per gallon in the form of tetraethyllead results in a considerable improvement in the antiknock quality of the fuel. The manganese to lead ratio in this case is 30:1.

The following examples are illustrative of fluids and fuels containing our new compounds.

EXAMPLE XVIII

To 1000 gallons of a commercial fuel having an initial boiling point of 90° F. and a final boiling point of 406° F. is added 59.4 grams of methylcyclopentadienyl manganese tricarbonyl, $C_6H_7Mn(CO)_3$, and the mixture subjected to agitation until the additive is distributed evenly throughout the fuel, in an amount equivalent to 0.015 gram of manganese per gallon of fuel.

Fuels containing mixtures of two or more cyclomatic manganese tricarcarbonyl compounds, such as mixtures of cyclopentadienyl manganese tricarbonyl and methylcyclopentadienyl manganese tricarbonyl, are prepared in a manner similar to that employed in this example.

EXAMPLE XIX

In a manner similar to that employed in Example XVIII, indenyl manganese tricarbonyl is blended with a commercial fuel having an initial boiling point of 94° F. and a final boiling point of 390° F. in an amount equivalent to 10 grams of manganese per gallon.

Fuels containing 6 grams of maganese in the form of methylcyclopentadienyl manganese tricarbonyl are prepared in a manner similar to that of Example XVIII.

EXAMPLE XX

To 11 parts of methylcyclopentadienyl manganese tricarbonyl is added 5 parts of ethylene dichloride and the mixture agitated until a homogeneous fluid results. The manganese to chlorine atom ratio in this fluid is 1:12 and represents 6 theories of halogen based on the manganese.

In like manner, a fluid is prepared comprising indenyl manganese tricarbonyl and ethylene dibromide in which the manganese to bromine ratio is 1:6, representing 3 theories of bromine based on the manganese. Likewise, a fluid containing ethylcyclopentadienyl manganese tricarbonyl, ethylene bromohydrin, and 2,3-dichloro-1,4-dimethylbenzene is prepared in such proportions that for every 75 atoms of manganese, there is one atom of bromine and two atoms of chlorine, representing the total of 0.02 theory of halogen.

The above fluids are added to hydrocarbon fuels in amounts so as to provide improved fuels containing 0.015 gram, 0.03 gram, 6 grams, and 10 grams of manganese per gallon.

EXAMPLE XXI

To 13.2 parts of lead in the form of tetraethyllead in an antiknock fluid containing 0.5 theory of bromine as ethylene dibromide and 1.0 theory of chlorine as ethylene dichloride, wherein the theories of halogen are based upon the amount of lead present, is added 0.015 part of manganese in the form of fluorenyl manganese tricarbonyl.

This fluid is then added to a commercial hydrocarbon fuel having an initial boiling point of 82° F. and a final boiling point of 420° F. in an amount so as to provide 13.2 grams of lead and 0.015 gram of manganese per gallon.

EXAMPLE XXII

A concentrated fluid is prepared as in Example XX containing kerosene, a blue dye, and 10 parts by weight of manganese as octylcyclopentadienyl manganese tricarbonyl for every 0.02 part of lead in the form of diethyldimethyllead. This fluid is then blended with a commercial hydrocarbon fuel having an initial boiling point of 90° F. and a final boiling point of 394° F. in an amount sufficient to provide 10 grams of manganese and 0.02 gram of lead per gallon.

EXAMPLE XXIII

A fluid is prepared containing 25 parts by weight of manganese as 1,3,4-tributylcyclopentadienyl manganese tricarbonyl and 158 parts of lead as tetraethyllead together with 0.1 theory of bromine as 2,3-dibromo-2,3-dimethylbutane, 0.5 theory of bromine as ethylene dibromide, and 1.0 theory of chlorine as ethylene dichloride. The theories of halogen are based on the total amount of lead and manganese metal present. This fluid is then added to a commercial hydrocarbon fuel having an initial boiling point of 112° F. and a final boiling point of 318° F. in an amount such as to provide 0.25 grams of manganese and 1.58 grams of lead per gallon.

EXAMPLE XXIV

To a fuel containing 0.02 gram of lead per gallon as diphenyldiethyllead, 1.0 theory of bromine as ethylene dibromide, and 0.2 theory of phosphorus in the form of tricresyl phosphate, is added phenylcyclopentadienyl manganese tricarbonyl in an amount equivalent to 0.03 gram of manganese per gallon. This small amount of manganese in the form of the compounds of this invention provides a considerable increase in the antiknock quality of the fuel as shown upon testing in a single-cylinder engine.

Other fuels and fluids are prepared in the same manner as illustrated hereinabove which contain other deposit-modifying agents, such as boric acid, borate esters, boronic esters, etc. Likewise, lubricating oils containing from about 0.1 to about 5 weight percent manganese in the form of the cyclomatic manganese tricarbonyl compounds of this invention are prepared, and these lubricating oils, when used in reciprocating engines, are found to have a beneficial effect on engine cleanliness and in the reduction of combustion chamber deposits.

EXAMPLE XXV

A commercial hydrocarbon fuel was blended according to the procedure of Example XXIII containing 0.53 gram of lead per gallon as tetraethyllead, 0.5 theory of bromine as ethylene dibromide and 1.0 theory of chlorine as ethylene dichloride, the theories of halogen being based on the amount of lead present, and 6.0 grams of manganese per gallon in the form of methylcyclopentadienyl manganese tricarbonyl. The manganese in the form of cyclomatic manganese tricarbonyl compounds in this fuel was found to enhance its antiknock value considerably as indicated upon testing in a single-cylinder test engine.

As stated hereinabove, the amount of manganese that can be employed in the form of cyclomatic manganese tricarbonyl compounds of this invention in hydrocarbon fuels of the gasoline boiling range can vary from about 0.015 to about 10 grams of manganese per gallon, preferably 0.03 to 6 grams of manganese per gallon. In addition, the fuel may also contain organolead antiknock compounds, such as tetraethyllead, in amounts equivalent to from about 0.02 to about 13.2 grams of lead per gallon.

In order to illustrate some of the advantages of employing the new cyclomatic manganese tricarbonyl compounds as anti-knock agents in fuels, a number of tests were conducted in which a single-cylinder C. F. R. knock test engine was operated on fuels containing varying amounts of the compounds of this invention. The test method employed was that described in test procedure D-908-51 contained in the 1952 edition of "ASTM Manual of Engine Test Methods" for rating fuels. The results of a number of tests in which fuels were employed containing only the compounds of this invention, compounds of this invention together with lead, and also fuels containing bis(cyclopentadienyl)iron and iron carbonyl are contained in Table I below.

The antiknock value of the fuels as determined by the ratings are given in octane numbers for figures below 100 and in Army-Navy performance numbers for values above 100. Performance numbers are determined by operating an engine on isooctane wherein the intake manifold pressure is supercharged by means of a fan until a knock is detected. The power output of the motor under these conditions is noted and the value for pure isooctane fuel is taken as baseline, and equal to 100. When a fuel other than isooctane is to be rated, the same procedure is followed. The power output of the test fuel is then compared to the power output of pure isooctane fuel. Thus, if a fuel results in 105 percent as much power output of an engine as when that engine is operated on isooctane under these conditions, the test fuel is said to have a performance number of 105.

Table I.—*Improvement in the antiknock quality of a 77.2 octane number fuel by the addition of different antiknock agents*

PART I

| $C_5H_5Mn(CO)_3$ g. per gal. | g. Mn per gal. | g. Pb as TEL/gal. | Octane Number |
|---|---|---|---|
| 0.00 | 0 | 0 | 77.2 |
| 1.85 | 0.5 | 0 | 86.3 |
| 3.71 | 1.0 | 0 | 89.4 |
| 7.42 | 2.0 | 0 | >93.2 |
| 11.13 | 3.0 | 0 | 96.9 |
| 16.7 | 4.5 | 0 | 98.8 |
| 0 | 0 | 1.06 | 85.6 |
| 1.85 | 0.5 | 1.06 | 89.3 |
| 3.71 | 1.0 | 1.06 | 91.7 |
| 7.42 | 2.0 | 1.06 | 96.7 |
| 11.13 | 3.0 | 1.06 | 98.9 |
| 0 | 0 | 3.17 | 90.0 |
| 1.85 | 0.5 | 3.17 | 95.5 |
| 3.71 | 1.0 | 3.17 | 96.6 |
| 7.42 | 2.0 | 3.17 | 98.8 |
| 11.13 | 3.0 | 3.17 | >100.0 |

PART II

| $C_6H_7Mn(CO)_3$ g. per gal. | g. Mn per gal. | g. Pb as TEL/gal. | Octane Number |
|---|---|---|---|
| 2.06 | 0.5 | 0 | 86.3 |
| 4.13 | 1.0 | 0 | 89.6 |
| 8.25 | 2.0 | 0 | 94.6 |
| 12.23 | 3.0 | 0 | 97.0 |
| 20.63 | 5.0 | 0 | 99.6 |
| 2.06 | 0.5 | 1.06 | 89.4 |
| 4.13 | 1.0 | 1.06 | 92.1 |
| 8.25 | 2.0 | 1.06 | 96.6 |
| 12.23 | 3.0 | 1.06 | 99.2 |
| 2.06 | 0.5 | 3.17 | 95.0 |
| 4.13 | 1.0 | 3.17 | 96.5 |
| 8.25 | 2.0 | 3.17 | 98.7 |

PART III

| $(C_5H_5)_2$Fe g. per gal. | g. Fe per gal. | g. Pb as TEL/gal. | Octane Number |
|---|---|---|---|
| 3.33 | 1.0 | 0 | 87.3 |
| 6.66 | 2.0 | 0 | 89.7 |
| 9.99 | 3.0 | 0 | 91.2 |
| 3.33 | 1.0 | 1.06 | 90.8 |
| 6.66 | 2.0 | 1.06 | 93.1 |
| 9.99 | 3.0 | 1.06 | 94.6 |
| 0 | 0 | 2.11 | 88.4 |
| 3.33 | 1.0 | 2.11 | 92.4 |
| 6.66 | 2.0 | 2.11 | 95.4 |
| 9.99 | 3.0 | 2.11 | 96.0 |

PART IV

| $Fe(CO)_5$ g. per gal. | g. Fe per gal. | g. Pb as TEL/gal. | Octane Number |
|---|---|---|---|
| 3.5 | 1.0 | 0 | 87.9 |
| 7.0 | 2.0 | 0 | 92.4 |

From the above it is seen that one gram of manganese per gallon in the form of cyclopentadienyl manganese tricarbonyl increases the octane value of the fuel from 77.2 to 89.4, an increase of 12.2 octane number units. It is also seen that one gram of iron per gallon in the form of either dicyclopentadienyl iron or iron pentacarbonyl increases the octane value of the fuel to 87.3 and 87.9 octane number units which represents an increase of only 10.1 and 10.7 octane numbers, respectively. It is thus seen that one gram of manganese in the form of cyclopentadienyl manganese tricarbonyl, one of the new antiknock agents of this invention, is 121 percent as effective as the same weight of iron in the form of dicyclopentadienyl iron and 120.6 percent as effective as iron in the form of iron pentacarbonyl when employed in the above described fuel in a single-cylinder engine.

An even greater advantage is observed in the use of the cyclomatic manganese carbonyl compounds of this invention when employed in conjunction with fuels containing alkyllead compounds, such as tetraethyllead. For example, when 3 grams of manganese in the form of cyclopentadienyl manganese tricarbonyl is added per gallon to a fuel containing one milliliter of tetraethyllead (1.06 grams of Pb) per gallon, the octane number of the fuel is found to be 98.9 as compared to 85.6 octane numbers of a fuel containing only the one milliliter of tetraethyllead. This represents an increase of 13.3 octane numbers. This amount of manganese as methylcyclopentadienyl manganese tricarbonyl increases the octane value by 13.6 units. On the other hand, 3 grams of iron in the form of dicyclopentadienyl iron, when added to the same fuel containing one milliliter of tetraethyllead per gallon, increases the octane value from 85.6 to 94.6 or only 9.0 octane number units. Thus, it is seen that the antiknock compounds of our invention are as much as 151 percent as good as previously discovered iron compounds in antiknock activity when used in leaded fuels of the type described hereinabove. The compounds of this invention are, therefore, particularly useful when employed as antiknock agents together with lead antiknock compounds in fuels and this constitutes a preferred embodiment of this invention. Further illustrative examples of the results obtained when the antiknock agents of this invention are employed in different hydrocarbon fuels is contained in the table below.

To further illustrate the effectiveness of manganese in the form of the compounds of this invention as antiknock agents, cyclopentadienyl manganese tricarbonyl and methylcyclopentadienyl manganese tricarbonyl were blended with different commercial fuels containing a mixture of straight-run, catalytically-cracked and polymer-blending stocks, both with and without tetraethyllead, and the octane rating of the fuel determined in a single-cylinder C. F. R. standard knock test engine as described above. The results of these tests are contained in Tables II and III below.

Table II.—*Antiknock ratings of different commercial fuels containing methylcyclopentadienyl manganese tricarbonyl, $C_6H_7Mn(CO)_3$, both with and without tetraethyllead* [1]

PART I.—COMMERCIAL FUEL HAVING AN I. B. P. OF 90° F. AND AN F. B. P. OF 406° F.

| $C_6H_7Mn(CO)_3$ g. metal/gal. | Octane Rating | | | | |
| --- | --- | --- | --- | --- | --- |
| | 0.21 g. Pb as TEL/gal. | 0.53 g. Pb as TEL/gal. | 1.58 g. Pb as TEL/gal. | 3.17 g. Pb as TEL/gal. | 6.34 g. Pb as TEL/gal. |
| 0 | 85.2 | 87.4 | 91.3 | 94.0 | 96.5 |
| 0.25 | 88.6 | | 92.3 | 95.3 | |
| 0.5 | 90.3 | | 93.2 | 95.8 | |
| 1.0 | 92.8 | | 95.1 | 96.9 | |
| 2.0 | 95.9 | | | | |

PART II.—COMMERCIAL FUEL HAVING AN I. B. P. OF 82° F. AND AN F. B. P. OF 422° F.

| $C_6H_7Mn(CO)_3$ g. metal/gal. | Octane Rating | | | |
| --- | --- | --- | --- | --- |
| | 1.04 g. Pb as TEL/gal. | 2.12 g. Pb as TEL/gal. | 3.2 g. Pb as TEL/gal. | 6.28 g. Pb as TEL/gal. |
| 0 | 91.1 | 93.5 | 95.2 | 97.8 |
| 0.5 | 94.0 | 96.1 | 97.4 | |
| 1.0 | 96.0 | 97.6 | 97.9 | |
| 2.0 | 98.8 | 99.4 | | |
| 3.0 | 101.5 | | | |

PART III.—COMMERCIAL FUEL HAVING AN I. B. P. OF 94° F. AND AN F. B. P. OF 390° F.

| $C_6H_7Mn(CO)_3$ g. metal/gal. | Octane Rating | | | |
| --- | --- | --- | --- | --- |
| | 0.0 g. Pb per gal. | 1.06 g. Pb as TEL/gal. | 3.17 g. Pb as TEL/gal. | 6.4 g. Pb as TEL/gal. |
| 0 | 83.1 | 89.2 | 93.2 | 96.5 |
| 0.5 | 90.2 | 92.3 | 95.7 | |
| 1.0 | 92.7 | 94.3 | | |
| 2.0 | 95.8 | 97.5 | | |
| 3.0 | 98.0 | | | |
| 5.0 | 102.0 | | | |

[1] All ratings over 100 are expressed in terms of performance numbers.

Table III.—*Antiknock ratings of different commercial fuels containing cyclopentadienyl manganese tricarbonyl, $C_5H_5Mn(CO)_3$, both with and without tetraethyllead* [1]

PART I.—COMMERCIAL FUEL HAVING AN I. B. P. OF 90° F. AND AN F. B. P. OF 406° F.

| $C_5H_5Mn(CO)_3$ g. metal/gal. | Octane Rating | | | |
| --- | --- | --- | --- | --- |
| | 0.19 g. Pb as TEL/gal. | 1.28 g. Pb as TEL/gal. | 3.20 g. Pb as TEL/gal. | 12.6 g. Pb as TEL/gal. |
| 0 | 84.9 | 90.2 | 94.1 | 99.1 |
| 0.5 | 90.6 | 93.0 | 95.7 | |
| 1.0 | 92.6 | 94.4 | 96.6 | |
| 2.0 | 95.3 | 96.9 | | |
| 3.0 | 97.3 | | | |

PART II.—COMMERCIAL FUEL HAVING AN I. B. P. OF 94° F. AND AN F. B. P. OF 390° F.

| $C_5H_5Mn(CO)_3$ g. metal/gal. | Octane Rating | | | |
| --- | --- | --- | --- | --- |
| | 0.0 g. Pb per gal. | 1.05 g. Pb as TEL/gal. | 3.22 g. Pb as TEL/gal. | 6.34 g. Pb as TEL/gal. |
| 0 | 83.1 | 89.1 | 92.3 | 96.4 |
| 0.5 | 89.8 | 92.3 | 94.9 | |
| 1.0 | 92.3 | 94.6 | 96.4 | |
| 2.0 | 95.7 | 97.2 | | |
| 3.0 | 97.7 | | | |

PART III.—COMMERCIAL FUEL HAVING AN I. B. P OF 112° F. AND AN F. B. P. OF 318° F.

| $C_5H_5Mn(CO)_3$ g. metal/gal. | Octane Rating | | | |
| --- | --- | --- | --- | --- |
| | 0.0 g. Pb per gal. | 1.07 g. Pb as TEL/gal. | 3.13 g. Pb as TEL/gal. | 6.28 g. Pb as TEL/gal. |
| 0 | 85.7 | 94.2 | 98.5 | 103.0 |
| 0.5 | 93.2 | 97.8 | 109.0 | |
| 1.0 | 97.0 | 101.0 | 114.0 | |
| 2.0 | 104.0 | 112.8 | | |
| 3.0 | 113.3 | | | |

[1] All ratings over 100 are expressed in terms of performance numbers.

From Tables II and III it is seen that 1.0 gram of manganese per gallon of fuel in the form of the new cyclomatic manganese tricarbonyl compounds of this invention increases the antiknock quality of the fuel by an amount which would require 3.22 grams of lead per gallon in the form of tetraethyllead. In other words, the manganese is 322 percent as effective as tetraethyllead in increasing the octane value of hydrocarbon fuels. It is seen further that when one gram of manganese in the form of cyclopentadienyl manganese tricarbonyl is added per gallon of fuel containing 3.13 grams of lead per gallon in the form of tetraethyllead, the increase in antiknock value is 15.5 octane numbers. To obtain this additional increase in octane number in a fuel containing 3.13 grams of lead per gallon, would require an additional 7 grams of lead per gallon in the form of tetraethyllead. Thus, the antiknock effectiveness of manganese in the form of the cyclomatic manganese tricarbonyl compounds of this invention is as much as 700 percent as effective as tetraethyllead when added to a fuel already containing 3.13 grams of lead per gallon. The advantages that can be obtained by the use of the novel antiknock agents of this invention, either as sole antiknock additives or in combination with tetraethyllead, is thus self-evident.

To further illustrate the antiknock effectiveness of the compounds of this invention, fuels containing these compounds were rated in multicylinder engines. One of these had a compression ratio of 10:1 which represents an advanced type of engine which is expected to be installed in automobiles in the near future. The other engine had a compression ratio of 8.5:1. The rating technique consisted of operating the engine at a particular speed and then advancing the spark until knocking was detected. Correlating the spark advance at trace knock with that of primary reference fuels of known octane number values, gives the octane number of the test fuel at the particular speed at which the engine is operated. This procedure is known as the modified borderline rating technique for determination of antiknock quality of fuels, as described by the Motor Fuels Division of the Coordinating Fuel and Equipment Research Committee, Coordinating Research Council, Inc. (CRC F27). The tables below contain the results of the tests run in the above two engines.

found, however, that when 1.26 grams of iron per gallon in the form of iron pentacarbonyl is employed in a commercial fuel containing 0.53 gram of lead per gallon in the form of tetraethyllead and having an octane number of 91.5, the octane number increase due to the presence of the iron is only 1.5 octane number units as determined in a similar engine operated at a speed of 1750 R. P. M. Thus, it is seen that the compounds of this invention are at least 494 percent as effective as iron carbonyl when employed in leaded commercial fuels in multicylinder engines at concentrations of 1.26 grams of the metal per gallon.

The additives of this invention are found to have a great effect on improving the operating characteristics of an engine with respect to octane requirement increase, surface ignition, and deposit weight in the combustion chamber. When an engine has been in operation for some time, it is found that a fuel of higher octane value is required than when the engine was first put into operation in order to give the same engine operating characteristics. This is probably due to a build-up of a certain amount of deposits in the combustion chamber. The increase in the antiknock quality of the fuel required after a period of operation in order to maintain the efficiency of the engine at the level observed when it was first put into service is called the octane requirement Table IV.—*Octane values as obtained in an overhead valve V-8 engine having a compression ratio of 8.5:1 by the modified borderline method using a fuel having an I. B. P. of 90° F. and an F. B. P. of 406° F.*

| Antiknock, g. metal/gal. | | Octane Ratings at Different Engine Speeds | | | | |
|---|---|---|---|---|---|---|
| $(C_2H_5)_4Pb$ | $C_6H_7Mn(CO)_3$ | 1,000 R. P. M. | 1,500 R. P. M. | 2,000 R. P. M. | 2,500 R. P. M. | 3,000 R. P. M. |
| 0.21 | 0 | 80.6 | 80.6 | 86.2 | 85.0 | 84.3 |
| 0.21 | 0.25 | 90.7 | 89.5 | 89.2 | 88.7 | 87.7 |
| 0.21 | 0.5 | 93.2 | 92.0 | 91.2 | 90.7 | 89.5 |
| 0.21 | 1.0 | 95.5 | 94.7 | 93.7 | 93.5 | 91.5 |
| 0.21 | 2.0 | 98.2 | 98.4 | 97.5 | 95.2 | 93.0 |
| 0.53 | 0 | 87.2 | 85.0 | 88.0 | 88.0 | 87.3 |
| 1.59 | 0 | 94.2 | 92.5 | 91.7 | 91.2 | 90.0 |
| 1.59 | 0.25 | 95.0 | 93.5 | 93.0 | 93.0 | 91.3 |
| 1.59 | 0.5 | 96.0 | 95.3 | 93.8 | 93.5 | 91.7 |
| 1.59 | 1.0 | 97.0 | 97.2 | 96.0 | 94.5 | 92.5 |
| 3.17 | 0 | 97.0 | 96.2 | 95.0 | 94.0 | 92.5 |
| 3.17 | 0.25 | 97.8 | 97.1 | 95.7 | 94.5 | 93.0 |
| 3.17 | 0.5 | 98.2 | 98.4 | 97.2 | 95.5 | 93.2 |
| 3.17 | 1.0 | 99.0 | 99.1 | 97.7 | ------ | ------ |
| 6.34 | 0 | 99.4 | 99.5 | 98.5 | 97.5 | 95.2 |

TABLE V.—*Octane values as obtained in an overhead valve V-8 engine having a 10:1 compression ratio by the modified borderline method using a fuel having an I. B. P. of 90° F. and an F. B. P. of 394° F.*[1]

| Antiknock, g. metal/gal. | | Octane Ratings at Different Engine Speeds | | | | |
|---|---|---|---|---|---|---|
| $(C_2H_5)_4Pb$ | $C_6H_7Mn(CO)_3$ | 1,000 R. P. M. | 1,500 R. P. M. | 2,000 R. P. M. | 2,500 R. P. M. | 2,750 R. P. M. |
| 0.21 | 0 | 96.2 | 95.0 | 94.7 | 93.5 | 92.2 |
| 0.21 | 0.25 | 99.7 | 97.5 | 95.5 | 94.5 | 94.0 |
| 0.21 | 0.5 | 102.5 | 98.2 | 96.0 | 95.7 | 94.7 |
| 0.21 | 1.0 | 104.0 | 98.5 | 96.5 | 96.0 | 95.0 |
| 0.21 | 2.0 | 112.5 | 101.5 | 98.2 | 97.0 | 96.2 |
| 0.53 | 0 | 98.7 | 97.5 | 96.0 | 95.0 | 94.0 |
| 1.59 | 0 | 101.5 | 98.7 | 97.0 | 96.0 | 95.0 |
| 1.59 | 0.25 | 105.5 | 99.2 | 98.0 | 96.7 | 96.0 |
| 1.59 | 0.5 | 107.5 | 100.5 | 98.0 | 97.7 | 95.7 |
| 1.59 | 1.0 | 114.0 | 102.5 | 98.2 | 97.0 | 95.7 |
| 3.17 | 0 | 108.5 | 100.0 | 98.7 | 97.7 | 97.2 |
| 3.17 | 0.25 | 110.5 | 102.0 | 98.7 | 98.0 | 98.0 |
| 6.34 | 0 | 116.5 | 107.0 | 99.5 | 98.5 | 98.5 |

[1] All ratings over 100 are expressed in terms of performance numbers.

From table IV, it is calculated that when 1.26 grams of manganese per gallon in the form of the compounds of our invention is added to a fuel containing 1.59 grams of lead as tetraethyllead per gallon, the increase in antiknock value is 7.4 octane numbers when the fuel is rated in the engine operated at 2000 R. P. M. It has been increase (ORI). To illustrate the above effects, a single-cylinder C. F. R. L-head test engine was operated on a cycling schedule consisting of 50 seconds at a speed of 600 R. P. M. and 150 seconds at 900 R. P. M. for a period of 40 hours. The fuel employed was of the commercial variety composed of a mixture of straight run, catalytically cracked, and polymeric blending stocks, having an initial boiling point of 94° F. and a final boiling point of 390° F. The fuel contained 1.0 gram per gallon of manganese in the form of methylcyclopentadienyl manganese tricarbonyl. The characteristics of the engine operated on this fuel were compared with the characteristics observed when the engine was operated on the same fuel containing 3.17 grams of lead as tetraethyllead together with 0.5 theory of bromine as ethylene dibromide and 1.0 theory of chlorine as ethylene dichloride, a conventional antiknock fuel mixture. In each case, operation was started with a clean engine and the engine characteristics observed during a 40-hour period of operation. It was found that when the fuel containing the antiknock of this invention was employed, the ORI of the engine at the end of the 40-hour period was only 69 percent of that observed when the tertaethyllead-containing fuel was employed. It was also noticed that the amount of surface ignition, that is, the number of times the fuel was ignited due to glowing deposits on the inner surface of the combustion chamber, was only 13 percent in the case of the fuel containing the new antiknock agent of this invention as compared to that observed for the tetraethyllead-containing fuel. In addition, the amount of deposit on the combustion chamber was found to be only 23 percent when the improved fuel of this invention was employed as compared to the leaded fuels. The improvement in the operating characteristics of spark ignition engines by the use of the improved fuels of this invention over conventional fuels is thus clearly demonstrated. The operation of the C. F. R. L-head engine on a fuel containing manganese and a halogen-containing compound as scavenger illustrates the advantage of employing a scavenger with our anti-knock additives. The engine was operated at 900 R. P. M. on a fuel/air ratio of 0.082 for a period of 3 hours using isooctane as fuel together with 3.12 grams of manganese per gallon in the form of methylcyclopentadienyl manganese tricarbonyl and varying amounts of halogenated compounds. In two such runs the scavenger consisted of 2 theories of chlorine as ethylene dichloride and 1 theory of bromine as ethylene dibromide, and it was found that the amount of manganese metal in the deposit remaining on the exhaust valve was 24.3 and 22.8 milligrams, respectively, as compared to 34.3 milligrams when no scavenger is employed. Thus, when the manganese-to-chlorine atom ratio is 1:4, the reduction in the amount of manganese in the deposit is 29.4 percent, and when the manganese-to-bromine atom ratio is 1:2, the reduction is 33.8 percent. Still greater reductions in the amount of deposit are obtained when higher concentrations of halogen up to an atom ratio of manganese-to-halogen of 1:12 are employed. When the engine is operated on a fuel containing 3.12 grams of manganese per gallon in the form of $C_6H_7Mn(CO)_3$ together with 13.25 grams of lead per gallon as tetraethyllead and an amount of ethylene dichloride as scavenger equivalent to a lead-to-chlorine atom ratio of 1:4, or a total metal-to-chlorine atom ratio of 1:2.1, it is found that the amount of manganese in the deposit on the exhaust valve is only 17.9 milligrams at the end of 3 hours of operation which represents a reduction of 48 percent as compared to a fuel containing only the manganese compound. Hence, it is seen that that it is advantageous to employ scavenger compounds in the improved fluids and fuels of this invention, both in the absence and presence of hydrocarbolead compounds.

Another advantage which the antiknock additives of this invention possess is their extremely low wear characteristics. For example, it is found that an engine operated on a commercial hydrocarbon fuel of the gasoline boiling range containing 3.17 grams of lead per gallon in the form of tetraethyllead, 0.5 theory of bromine as ethylene dibromide, and 1.5 theory of chlorine as ethylene dichloride—the theories of halogen being based on the amount of lead present—and 0.07 gram of manganese as methylcyclopentadienyl manganese tricarbonyl does not exhibit any increase in wear over the same fuel with no cyclomatic manganese tricarbonyl compounds present. The amount of wear was determined by the rate of loss in weight by the upper piston ring according to the method disclosed in U. S. 2,315,845. When, on the other hand, iron compounds such as iron carbonyl are employed together with tetraethyllead in fuels, the wear rate goes up considerably due to the presence of the iron.

The new antiknock agents of this invention may be mixed with antioxidants, such as alkylated phenols and amines, metal deactivators, phosphorus compounds, and other antiknock agents, such as amines and alkyllead compounds, anti-rust and anti-icing agents, and wear inhibitors, may also be added to the antiknock composition or fuel containing the same.

In like manner, the fuels to which the antiknock compositions of this invention are added may have a wide variation of compositions. These fuels generally are petroleum hydrocarbons and are usually blends of two or more components. These fuels can contain all types of hydrocarbons, including paraffins, both straight and branched chain; olefins; cycloaliphatics containing paraffin or olefin side chains; and aromatics containing aliphatic side chains. The fuel type depends on the base stock from which it is obtained and on the method of refining. For example, it can be a straight run or processed hydrocarbons, including thermally cracked, catalytically cracked, reformed fraction, etc. When used for spark-fired engines, the boiling range of the components of gasoline can vary from zero to about 430° F., although the boiling range of the fuel blend is often found to be between an initial boiling point of from about 80° F. to 100° F. and a final boiling point of about 430° F. While the above is true for ordinary gasoline, the boiling range is a little more restricted in the case of aviation gasoline. Specifications for the latter often call for a boiling range of from about 82° F. to about 338° F., with certain fractions of the fuel boiling away at particular intermediate temperatures.

The hydrocarbon fuels in which the antiknock agent of this invention can be employed often contain minor quantities of various impurities. One such impurity is sulfur, which can be present either in a combined form as an organic or inorganic compound, or as the elemental sulfur. The amounts of such sulfur can vary in various fuels from about 0.003 percent to about 0.30 percent by weight. Fuels containing quantities of sulfur, both lesser and greater than the range of amounts referred to above, are also known. These fuels also often contain added chemicals in the nature of antioxidants, rust inhibitors, dyes, and the like.

A particular advantage of the new compositions of matter of the present invention is the fact that by proper selection of the individual groups comprising such compositions, compounds having "tailormade" characteristics can be obtained. Thus, by the proper selection of the cyclomatic group, it is possible to prepare compounds possessing differing degrees of stability, volatility, and solubility. Likewise, the selection of these constituents also enables the preparation of compounds of diverse applicability.

Other important uses of the cyclomatic compounds of the present invention include the use thereof as chemical intermediates, particularly in the preparation of metal and metalloid containing polymeric materials. In addition, some of the cyclomatic derivatives of this invention can be used in the manufacture of medicinals and other therapeutic materials, as well as agricultural chemicals such as, for example, fungicides, insecticides, defoliants, growth regulants, and so on.

Having fully described the novel cyclomatic derivatives of the present invention, the need therefor, and the best methods devised for their preparation, we do not intend that our invention be limited except within the spirit and scope of the appended claims.

We claim:

1. A cyclopentadienyl manganese tricarbonyl having the following general formula $$AMn(CO)_3$$

wherein A is a cyclopentadienyl hydrocarbon group having from 5 to 17 carbon atoms and wherein the cyclopentadienyl group is bonded to the manganese through the carbons of the cyclopentadienyl ring.

2. Methylcyclopentadienyl manganese tricarbonyl.

3. Indenyl manganese tricarbonyl.

4. A compound as defined by claim 1 in which said cyclopentadienyl hydrocarbon group has 5 carbon atoms.

References Cited in the file of this patent

UNITED STATES PATENTS

| | | |
|---|---|---|
| 2,338,578 | Downing et al. | Jan. 4, 1944 |
| 2,409,167 | Veltman | Oct. 8, 1946 |
| 2,546,241 | Bartholomew et al. | Mar. 27, 1951 |
| 2,680,758 | Thomas | June 8, 1954 |
| 2,694,721 | Weinmayr | Nov. 16, 1954 |

OTHER REFERENCES

Fischer et al.: "Zeit. Naturforsch.," 9(b), page 618, September 1954.